United States Patent [19]

Blomsterberg

[11] Patent Number: 5,256,262
[45] Date of Patent: Oct. 26, 1993

[54] SYSTEM AND METHOD FOR ELECTROLYTIC DEBURRING

[76] Inventor: Karl-Ingemar Blomsterberg, Nansensgatan 38, S-417 19 Gothenburg, Sweden

[21] Appl. No.: 879,923

[22] Filed: May 8, 1992

[51] Int. Cl.$^5$ .............................................. B23H 9/02
[52] U.S. Cl. ............................ 204/129.1; 204/724 M; 204/228; 204/231; 204/DIG. 7; 204/129.43; 204/268
[58] Field of Search ........... 204/129.1, 129.55, 224 M, 204/228, 231, 198, DIG. 7, 129.43, 268

[56] References Cited

U.S. PATENT DOCUMENTS

| | | | |
|---|---|---|---|
| 1,798,391 | 3/1931 | Würth | 204/231 X |
| 3,449,226 | 6/1969 | Williams | 204/224 M |
| 4,486,279 | 12/1984 | Fromson et al. | 204/224 M |
| 4,601,803 | 7/1986 | Gregory | 204/224 M |
| 4,752,367 | 6/1988 | Vishnitsky | 204/224 M |

*Primary Examiner*—Donald R. Valentine
*Attorney, Agent, or Firm*—Iandiorio & Dingman

[57] ABSTRACT

An electrolytic deburring system and method employing a relatively weakly conducting electrolyte with the cathode immersed in the electrolyte in which an anodic potential is applied to the workpiece being deburred. A conductive element acting as a virtual cathode is placed between the cathode and the part to provide a more conductive path than the existing path through the electrolyte to concentrate deburring action and/or shield a portion of the workpiece from the deburring action.

For deburring a multiplicity of parts at the same time, two electrodes are immersed in the electrolyte and a potential difference is applied between them. Spaced parts placed between the electrodes assume potential differences leading to selective material removal from the relatively anodic portions of each part. The polarity of the applied potential may be reversed, thereby reversing the polarity of the potential differences between the parts to selectively remove material from the newly anodic portions of the parts.

18 Claims, 3 Drawing Sheets

SYSTEM AND METHOD FOR ELECTROLYTIC DEBURRING

FIELD OF INVENTION

This invention relates to a system and method for electrolytic deburring in which a virtual electrode between the anode and cathode is used to direct deburring at a specified point and/or shield portions of the part from deburring action.

BACKGROUND OF INVENTION

Electrolytic smoothing of conductive parts is a commonly employed technique. Two well-known processes are called electrochemical deburring (ECD) and electro polishing. Such smoothing operations are herein referred to as deburring.

Conventional ECD uses a highly conductive salt solution as the electrolyte. Because the solution is so conductive, the anodic part being deburred must be spaced extremely closely (separation of 10 to 30 mils) for effective, controlled metal removal. Electropolishing employs hazardous hot acidic electrolytes and is only effective in removing small burrs.

An improvement to these typical processes is described in U.S. Pat. Nos. 4,405,422, and 4,411,751, by the same inventor and incorporated herein by reference. These patents describe a process employing a less-conductive and less harzardous electrolyte that accomplishes deburring with a much larger separation between electrodes and part or parts, typically 1 to 3 inches.

In either process, however, it can be difficult and expensive to deburr complex-shaped parts and especially parts with burrs which do not protrude from the part being deburred; such buried burrs are reached by little if any current, and thus are not fully removed in the deburring process. It has been the practice in such instances to construct cathodically connected probes of a size and shape to introduce cathodic potential near the locations of such shielded burrs. Although this technique if carefully done will effectively remove the burr, it creates a number of problems. For example, a large or difficult to see burr may come into contact with the cathodic probe during operation and create a short circuit which can destroy the probe, boil the electrolyte, and fuse the burr material, any of which would prevent successful completion of the deburring process. In addition, it can be difficult, expensive, and time consuming to construct and cathodically connect these probes. Also, the probes in effect create a complex-shaped cathode which surrounds and/or penetrates the part. Accordingly, it is not possible to move the part relative to the cathode during deburring. As a result, this process does not readily lend itself to automation or deburring of many parts at the same time.

SUMMARY OF INVENTION

It is therefore an object of this invention to provide an electrolytic deburring system and method which allows the inexpensive deburring of parts with shielded burrs.

It is a further object of this invention to provide such a system and method which allows the deburring of many parts at once.

It is a further object of this invention to provide such a system and method in which the parts can be conveyed through the electrolyte to create a continuous-deburring system.

It is a further object of this invention to provide such a system and method in which portions of the part being deburred can be shielded partially or fully from the deburring action.

It is a further object of this invention to provide such a system and method in which short circuits between the cathode and anode are prevented.

This invention results from the realization that deburring of shielded burrs may be efficiently accomplished by placing a conductor with one end between the cathode and part being deburred and the other end proximate the shielded burr to direct current flow from the burr without having to physically connect the conductor to the cathode, thus preventing any chance of a short circuit.

This invention consists essentially of an electrolytic deburring system and method. The system includes an electrolyte, cathode means for applying a cathodic potential to the electrolyte, means for applying an anodic potential to a part to be deburred in contact with the electrolyte, and a conductive element within the electrolyte with at least a first end between the cathode means and the part for attracting current to change the current flow between the part and the cathode means for altering the deburring of the part. The conductive element has a conductivity greater than that of the electrolyte to create a preferred current path for allowing the selective removal of burrs that are fully or partially shielded from the normal electric field and/or to shield portions of the workpiece proximate the conductive element whereby current is effectively stolen from a portion of the workpiece.

Especially for removing internal burrs, the conductor may be an insulated member with bared ends, for example, a wire. In one embodiment, an anode is used to apply the anodic potential in the electrolyte. In another embodiment, a number of parts can be deburred at the same time in the electrolyte. This may be accomplished by placing one part physically closer to the cathode means than a second part so the first part conducts current to the second part through the electrolyte. The parts are kept separated so there is no undesired contact between parts. The parts may also be moved through the electrolyte to accomplish a continuous deburring process. There may also be included means for reversing potential direction between the cathode means and the means for applying an anodic potential to reverse the deburring effect between multiplicity of parts.

The electrolytic deburring method contemplates immersing a part to be deburred in an electrolyte, providing a potential difference between the part and the spaced cathode, and introducing a conductor between the cathode and the part to change the current flow between the part and the cathode for altering the deburring of the part. Preferably, the conductor has one end between the part and the spaced cathode and the other end proximate a burr to concentrate current flow at the burr. The conductor may be an insulated wire with bared ends. The method may also include means for holding a plurality of parts in the electrolyte, and means for moving parts through the electrolyte.

DISCLOSURE OF PREFERRED EMBODIMENT

Other objects, features and advantages will occur to those skilled in the art from the following description of a preferred embodiment and the accompanying drawings, in which.

This invention may be accomplished in an electrolytic deburring system and method which is particularly adapted for removing burrs in recesses or cavities, for example, that are effectively shielded from the external electric field, such removal being accomplished with a virtual electrode between the cathode and anode for providing a more conductive path to a point proximate the hidden burr to facilitate burr removal.

Figure 1A:
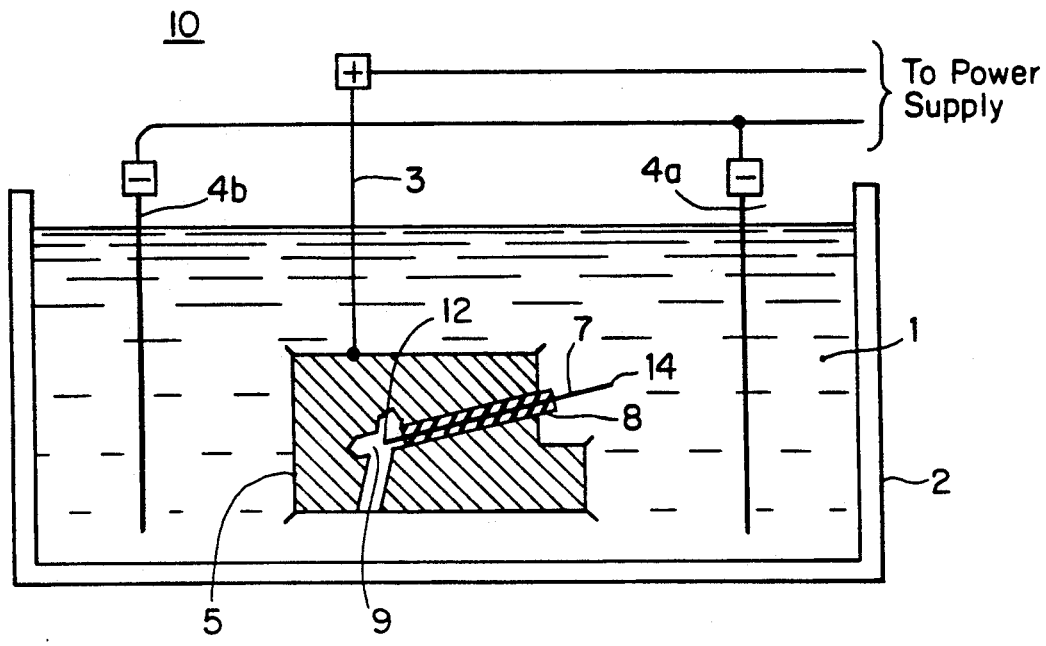
FIG. 1A is a schematic, cross-sectional diagram of an electrolytic deburring system employing the system and method of this invention for removing a shielded burr.
Figure 1B:
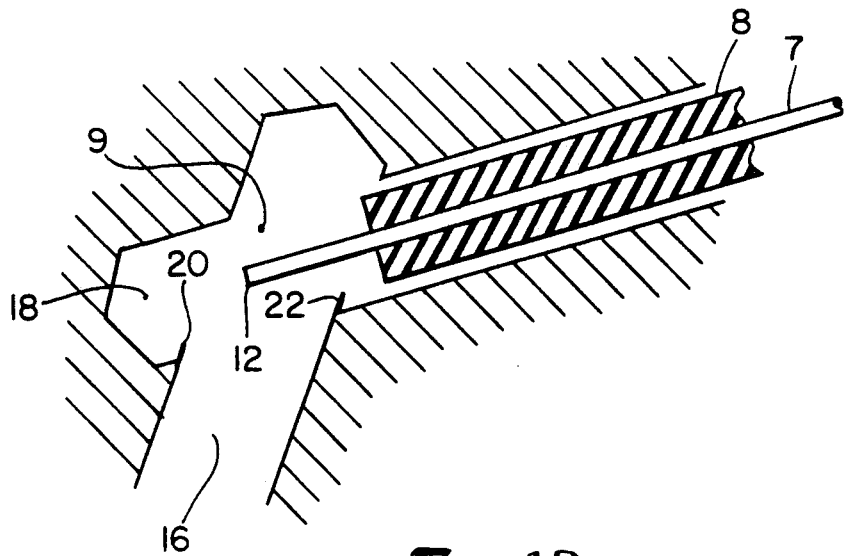
FIG. 1B is a greatly enlarged cross-sectional view of the active deburring area of FIG. 1A.

There is shown in FIGS. 1A and 1B electrolytic deburring system 10 for accomplishing the system and method of this invention. Deburring system 10 includes tank 2 for holding electrolyte 1. Electrolyte 1 is preferably an electrolyte of the composition disclosed in U.S. Pat. Nos. 4,405,422 and/or 4,411,751. This electrolyte composition allows workpiece 5, anodically connected by conductor 3, to be deburred while it is submerged within solution 1 and spaced from cathode plates 4a and 4b. Part 5 has a number of external burrs which are removed in conventional fashion as described in the patents incorporated by reference. Part 5 also has internal burrs which are shielded from the electric field between the anode and cathode, for example as found in the internal intersection 9 between blind holes 16 and 18, shown in more detail in the enlarged view of FIG. 1B. Virtual cathode 7 in this embodiment is an insulated wire with bared ends 14 and 12 and insulation 8. End 14 is placed somewhere between the surface of part 5 and one of the cathode plates 4a and 4b, and end 12 is placed proximate burrs 20 and 22 to be removed. Insulation 8 keeps conductor 7 from contacting part 5.

Conductive element 7, which has a greater electrical conductivity than that of the electrolyte, thus creates a preferred current path to draw current from burrs 20 and 22 into end 12 along conductor 7 to end 14 and then across the electrolyte to cathode 4a.

If end 12 inadvertently contacts a burr, no short circuit will be created, since cathodic end 14 of conductor 7 is spaced from cathode 4a. Since no direct short circuit can be created, the adverse effects of excessive current which would have resulted in a conventional deburring system are alleviated.

The current carried by virtual cathode 7, and hence the rate at which internal burrs 20 and 22 are dissolved, may be controlled by varying the size and shape of virtual cathode 7, the distance between end 12 of virtual cathode 7 and workpiece 5 and/or the distance between cathodic end 14 of conductor 7 and cathodes 4a and 4b.

Because virtual cathode 7 attracts current, the field lines within electrolyte 1 are altered. The results of the attraction of current to conductor 7 is the at least partial shielding of areas of workpiece 5 around the area where conductor 7 emerges from the interior of workpiece 5. Thus, conductor 7 can be configured or shaped as desired to channel current flow within the electrolyte to accomplish selective shielding of external workpiece artifacts.

Figure 2B:
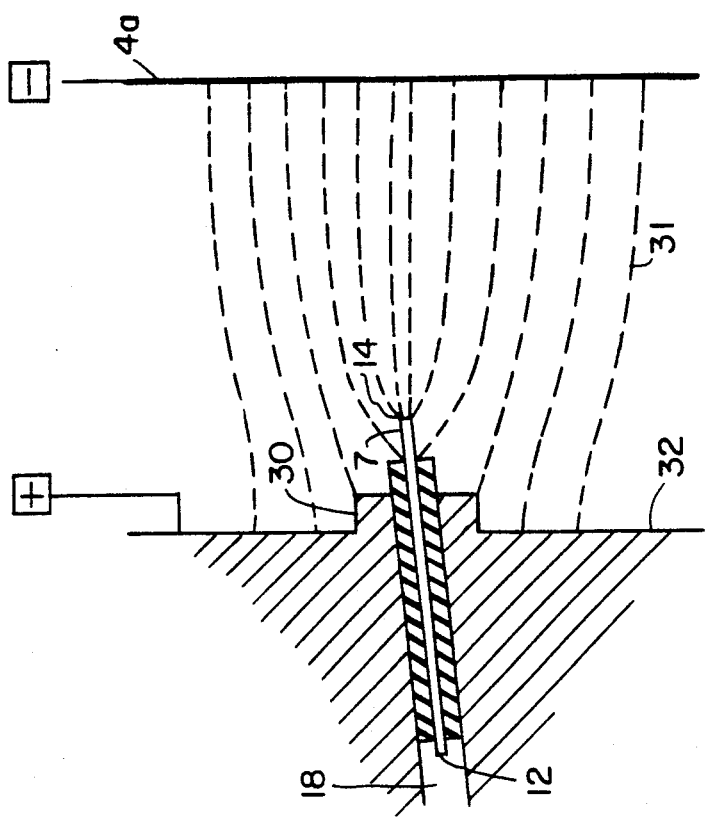
FIG. 2B is the section of FIG. 2A with a virtual electrode inserted in the workpiece illustrating the shielding effect accomplished by this invention.
Figure 2A:
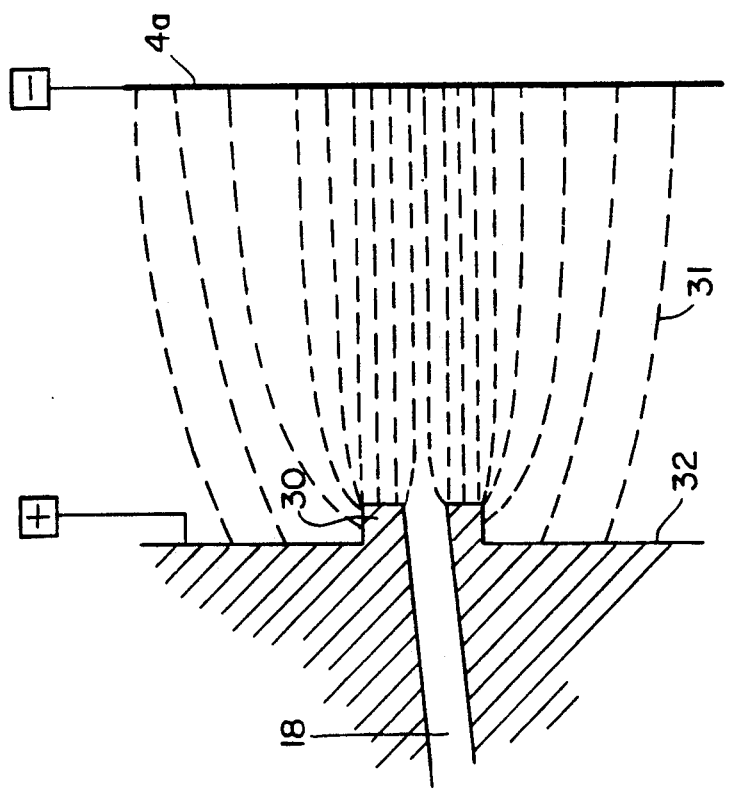
FIG. 2A is a cross-sectional view of a workpiece under conventional deburring conditions illustrating the concentration of field lines at the protruding boss edges.

FIG. 2A represents a section of a workpiece 32, similar to workpiece 5 of FIG. 1A, except that a boss 30 of critical dimensions is located on the surface around hole 18. Under normal deburring conditions, the electric field lines 31 will be concentrated at the edges of boss 30, resulting in the likelihood of excessive material removal in view of the tight dimensional tolerances of boss 30.

FIG. 2B shows the same workpiece with virtual cathode 7 inserted in hole 18, as described earlier. Virtual cathode end 14 distorts the electric field by attracting some of field lines 31 to itself, thereby weakening the field concentration at boss 30 and beneficially reducing the material removal there. Virtual cathode end 12 may be extended within the workpiece to act in removal of internal burrs, if any, as described earlier. If there are no burrs within hole 18, then the action of virtual cathode 7 will merely be the removal of incidental material from the wall of hole 18, coupled with the exterior partial shielding effect just described.

Figure 3:
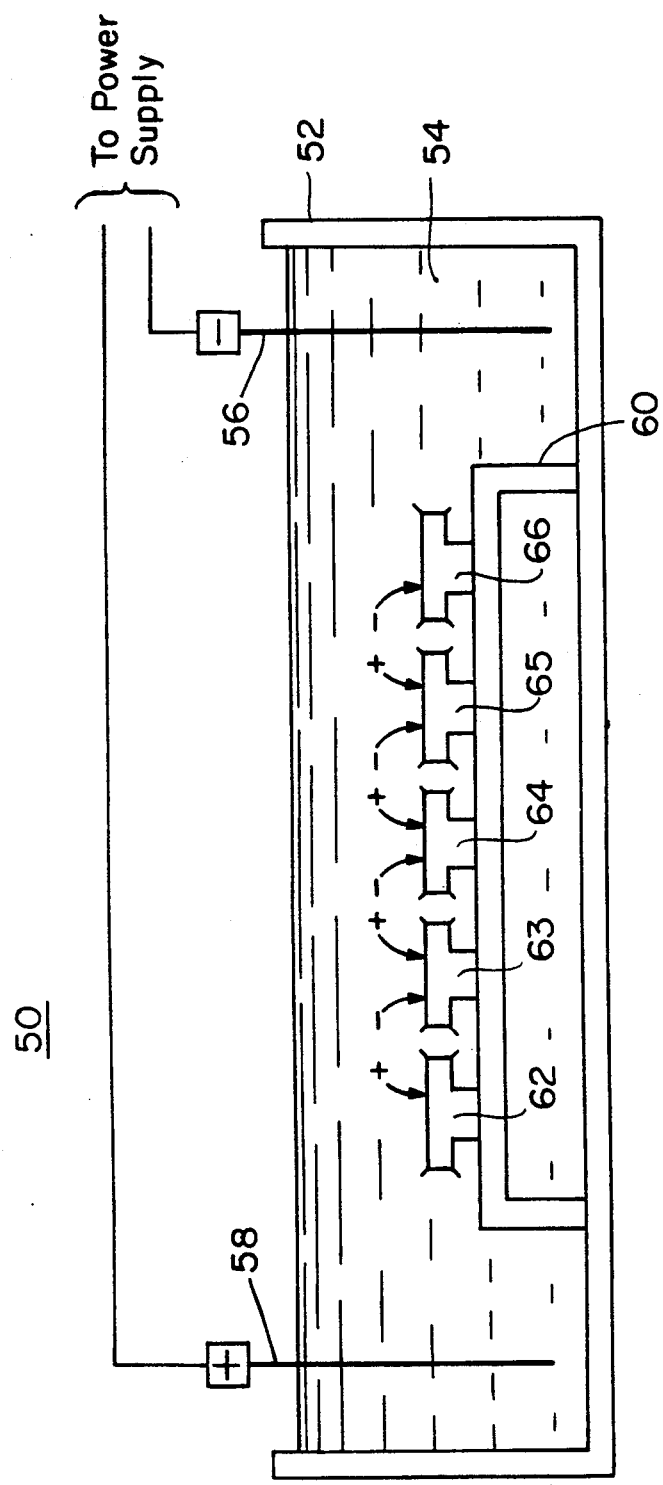
FIG. 3 is an alternative embodiment of the system and method of this invention which allows for the deburring of a number of parts at the same time in a continuous deburring process.

In FIG. 3, another embodiment, system 50 for accomplishing the system and method of this invention, includes tank 52 with electrolyte 54 therein in the same manner as described above. In this case, workpieces 62 through 66 are being deburred. Workpieces 62 through 66 are placed on insulating table or support 60 between cathode 56 and anode 58. The field created in electrolyte 54 between cathode 56 and anode 58 causes the workpieces to act as virtual electrodes for one another as follows: workpiece 62 is anodic (positive) with respect to workpiece 63, which is itself anodic with respect to workpiece 64, which is anodic with respect to workpiece 65, which is anodic with respect to workpiece 66. Accordingly, the portion of workpiece 62 facing workpiece 63 will be deburred, as will the portion of each workpiece shown on the right hand side of each workpiece in the view of FIG. 2. To accomplish deburring of both sides of all of the workpieces, the system includes means for periodically reversing the polarity so that conductor 58 becomes the cathode and conductor 56 becomes the anode. Each workpiece 62 through 66 is thus a virtual cathode with respect to one of its neighbors, and simultaneously a virtual anode with respect to the other neighbor. Of course, conductors 56 and 58 complete the conductive chain as the end anode and cathode of the system depending on the direction of polarity.

System 50 thus allows the deburring of a number of workpieces at the same time using the virtual electrode concept of this invention. Since the workpieces do not have to be physically attached to either the anode or cathode, system 50 lends itself to a continuous process in which a conveyor or other carrying mechanism is substituted in place of insulating rack 60. If required, the workpieces may carry virtual cathodes, since such virtual cathodes require no connections to fixed cathodes. It is simply necessary to arrange the parts with the proper spacing and to create the proper submersion time and current density and polarity reversing to sufficiently deburr the workpieces as they are moved along between the anode and cathode plates.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An electrolytic deburring system, comprising:
   means for containing an electrolyte;
   cathode means for applying a cathodic potential in said electrolyte;
   means for connecting an anodic potential to a part to be deburred when in contact with said electrolyte; and
   a conductive element within said container with at least a first end being between said cathode means and said part to change the current flow between said part and said cathode means for altering the deburring of the part; said first end being spaced from said cathode means to prevent direct connection to said cathode means.

2. The electrolytic deburring system of claim 1 in which said conductive element has a conductivity greater than that of said electrolyte.

3. The electrolytic deburring system of claim 1 in which said conductive element has a second end proximate said part for conducting current to the part.

4. The electrolytic deburring system of claim 1 in which said conductive element includes an insulated conductor with bared ends.

5. An electrolytic deburring method, comprising:
   providing a cathodic potential to an electrolyte;
   providing an anodic potential to a part to be deburred immersed in the electrolyte; and
   placing an elongated conductor with one end between the part and the source of cathodic potential and the other end proximate a burr on or within the part to direct current flow from the burr to permit or hasten dissolution of the burr; said one end being spaced from said source of cathodic potential to prevent direct connection.

6. The electrolytic deburring method of claim 5 in which the conductor has one end between the part and the spaced cathode and another end proximate a burr to concentrate current flow at the burr.

7. The electrolytic deburring method of claim 6 in which the conductor is an insulated wire with bared ends.

8. An electrolytic deburring method, comprising:
   immersing spaced conductors in an electrolyte;
   providing a potential difference between the conductors; and
   placing a plurality of spaced parts to be deburred in the electrolyte.

9. The electrolytic deburring method of claim 8 further including reversing the polarity of the potential difference between said conductors to more uniformly deburr the parts.

10. The electrolytic deburring method of claim 9 in which the polarity reversal is accomplished periodically.

11. The electrolytic deburring method of claim 8 further including means for moving parts through the electrolyte.

12. An electrolytic deburring system, comprising:
    means for containing an electrolyte;
    cathode means for applying a cathodic potential in said electrolyte; and
    anode means in said container, spaced from and not directly connected to a part to be deburred when said part is in contact with said electrolyte, and for indirectly applying an anodic potential to the part.

13. The electrolytic deburring system of claim 12 further including a conductive element within said container with at least a first end between said cathode means and said part to change the current flow between said part and said cathode means for altering the deburring of the part, said first end being spaced from said cathode means to prevent direct connection to said cathode means.

14. The electrolytic deburring system of claim 12 further including means for deburring a plurality of parts in said electrolyte.

15. The electrolytic deburring system of claim 14 in which a first said part is closer to said cathode means than a second said part so that said first part can conduct current to said second part.

16. The electrolytic deburring system of claim 14 further including means for keeping said parts separated to prevent undesired contact between parts.

17. The electrolytic deburring system of claim 14 in which said means for deburring includes means for moving said parts through the electrolyte.

18. The electrolytic deburring system of claim 14 further including means for reversing potential direction between said cathode means and said means for applying an anodic potential to reverse the deburring effect between said parts.

* * * * *